United States Patent
Anatole et al.

(10) Patent No.: US 10,459,247 B2
(45) Date of Patent: Oct. 29, 2019

(54) METHOD FOR MANUFACTURING AN OPHTHALMIC LENS COMPRISING A MARKING STEP FOR PRODUCING PERMANENT TECHNICAL MARKS ON SAID OPHTHALMIC LENS

(71) Applicant: ESSILOR INTERNATIONAL (COMPAGNIE GENERALE D'OPTIQUE), Charenton-le-Pont (FR)

(72) Inventors: Vincent Anatole, Charenton-le-Pont (FR); Cecile Pietri, Charenton-le-Pont (FR)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 695 days.

(21) Appl. No.: 14/431,596

(22) PCT Filed: Sep. 26, 2013

(86) PCT No.: PCT/FR2013/052282
§ 371 (c)(1),
(2) Date: Mar. 26, 2015

(87) PCT Pub. No.: WO2014/049284
PCT Pub. Date: Apr. 3, 2014

(65) Prior Publication Data
US 2015/0253585 A1    Sep. 10, 2015

(30) Foreign Application Priority Data

Sep. 28, 2012  (FR) ...................................... 12 59197

(51) Int. Cl.
*G02C 7/02*      (2006.01)
*B33Y 10/00*    (2015.01)
(Continued)

(52) U.S. Cl.
CPC ............ *G02C 7/021* (2013.01); *B29C 64/106* (2017.08); *B29C 64/124* (2017.08);
(Continued)

(58) Field of Classification Search
CPC ........ G02C 7/021; B33Y 10/00; B33Y 30/00; B33Y 40/00; B33Y 80/00; B29C 64/124;
(Continued)

(56) References Cited

U.S. PATENT DOCUMENTS 4,238,524 A  *  12/1980  LaLiberte ............. B29D 11/00
                                                                  427/145
5,960,550 A  *  10/1999  Weir ...................... G02C 7/021
                                                                  33/200
(Continued)

FOREIGN PATENT DOCUMENTS

DE   10 2009 004377 A1      7/2010
DE    102009004377 A1  *   7/2010   ....... B29D 11/00432
(Continued)

OTHER PUBLICATIONS

International Search Report, dated Jan. 23, 2014, from corresponding PCT application.

*Primary Examiner* — James Mellott
(74) *Attorney, Agent, or Firm* — Young & Thompson (57) ABSTRACT

A method for manufacturing an ophthalmic lens (12), includes a marking step for producing permanent technical marks (24) on the lens, which includes a body (29), a first surface (20) and a second surface (28) opposite the first surface (20); the step of additive manufacturing (110-112) of the body and the first and second surfaces, by depositing a plurality of first predetermined volume elements of a first material having a first complex index of refraction (35), in order to obtain first and second optical surfaces, respectively, of the first and second surfaces; and the step of (Continued)

additive manufacturing (113) of the marks by depositing, during the deposition of a plurality of the first volume elements of the first material, at least one second predetermined volume element of a second material having a second complex index of refraction (30) other than the first complex index of refraction of the first material.

18 Claims, 4 Drawing Sheets

(51) Int. Cl.
    *B33Y 30/00* (2015.01)
    *B33Y 40/00* (2015.01)
    *B33Y 80/00* (2015.01)
    *B29C 64/124* (2017.01)
    *B29C 64/106* (2017.01)
    *B29D 11/00* (2006.01)
    *B29L 11/00* (2006.01)

(52) U.S. Cl.
    CPC .. *B29D 11/00009* (2013.01); *B29D 11/00317* (2013.01); *B29D 11/00432* (2013.01); *B33Y 10/00* (2014.12); *B29L 2011/0016* (2013.01); *B33Y 30/00* (2014.12); *B33Y 40/00* (2014.12); *B33Y 80/00* (2014.12)

(58) Field of Classification Search
    CPC ............ B29C 64/106; B29D 11/00009; B29D 11/00317; B29D 11/00432; B29L 2011/0016
    See application file for complete search history.

(56) References Cited

U.S. PATENT DOCUMENTS

2006/0126016 A1\* 6/2006 Yokoyama ............ B29C 33/428
    351/159.69
2007/0115429 A1\* 5/2007 Divo .................... G02C 13/005
    351/159.69

FOREIGN PATENT DOCUMENTS

DE      102009004377 A1 \* 7/2010 ....... B29D 11/00432
WO      02/087859 A1    11/2002

\* cited by examiner

Fig.3

METHOD FOR MANUFACTURING AN OPHTHALMIC LENS COMPRISING A MARKING STEP FOR PRODUCING PERMANENT TECHNICAL MARKS ON SAID OPHTHALMIC LENS

BACKGROUND OF THE INVENTION

Field of the Invention

The invention relates to methods for manufacturing ophthalmic lenses comprising a marking step for producing technical permanent marks on these ophthalmic lenses.

The invention also relates to a machine for manufacturing such ophthalmic lenses.

Description of the Related Art

It is known that ophthalmic lenses undergo various manufacturing steps. The manufacturing methods generally employed to obtain a finished lens tailored to the shape of a particular frame typically comprise steps of machining by turning on a lathe as well as steps in the course of which the ophthalmic lens receives on its surface technical and/or commercial permanent marks and/or technical and/or commercial temporary marks.

These marks can be formed for example by molding, etching, or chemical attack. They represent diverse symbols (for example circles, crosses, logos of the manufacturer) and identify a particular point (for example the prism reference point for a progressive ophthalmic lens), or axis lines, or shapes indicating a particular zone (for example, the near vision zone or the far vision zone in the case of a progressive ophthalmic lens). The technical marks, permanent and/or temporary, are the ones known as geometric marks which are representative of optical characteristics.

The production of the technical permanent marks requires the creation of one or more reference systems for the proper positioning of these marks on the lens. Indeed, it is these technical marks which will for example make it possible to correctly position one face of the lens with respect to the other for its machining (for example surfacing or edging), and/or to center the ophthalmic lens in the frame.

These technical permanent marks may be produced on one of the faces of the lens, for example the front face, before the machining of the other face of the lens, or the rear face in the case of certain ophthalmic lenses.

In a known method for manufacturing a progressive ophthalmic lens, the lens is fastened by its front face (for example convex), in a first reference system, so that the concave surface of its rear face is machined by turning on a lathe in a second reference system. Thereafter, this machined concave surface is polished in a third reference system before undergoing one or more marking operations in a fourth reference system.

It will be noted that the technical permanent marks are generally produced with the aid of Excimer or $CO_2$ type laser marking machines. These laser marking machines act on the ophthalmic lens by degradation or ablation of matter, generating deformations or removing matter on the face of the ophthalmic lens on which these marks are produced.

In another known method for manufacturing an ophthalmic lens, the lens is molded in a plastics casting machine and the technical permanent marks are also made on a face of the glass in the same machine. This machine is provided with a mold comprising half-molds (manufactured by machining) on which, in a first reference system, the draft faces of the mold are formed and then, in a second reference system, notches are made by etching to form the technical permanent marks.

SUMMARY OF THE INVENTION

The invention is aimed at providing a method for manufacturing an ophthalmic lens comprising a marking step for producing technical permanent marks on this ophthalmic lens, which is particularly simple, convenient and economical to implement.

The subject of the invention is thus a method for manufacturing an ophthalmic lens, comprising a marking step for producing technical permanent marks on said ophthalmic lens, which exhibits a body, a first face and a second face opposite to said first face, which first face and second face define respectively a first optical surface and a second optical surface; said method being characterized in that it comprises the following steps:

additively manufacturing said body and said first and second faces, by the deposition of a plurality of first predetermined volume elements of a first material having a first complex refractive index, so as to obtain said first and second optical surfaces;

additively manufacturing said technical permanent marks by the deposition, during said deposition of a plurality of said first volume elements of said first material, of at least one second predetermined volume element of a second material having a second complex refractive index different from said first complex refractive index of said first material;

with said method which is configured so that the technical permanent marks are characteristic of an optical reference system to be provided to said ophthalmic lens and are located in said ophthalmic lens in a determined position dependent on said first and second optical surfaces.

The manufacturing method according to the invention makes it possible advantageously to manufacture the ophthalmic lens in one selfsame additive manufacturing step.

It is this single additive manufacturing step which makes it possible to provide at one and the same time the simple or complex optical properties of the ophthalmic lens as well as the technical permanent marks' localisation properties, in a single step during the additive manufacture of the body and the first and second faces. This makes it possible for the technical permanent marks to be precisely positioned in the ophthalmic lens.

The invention applies here exclusively to markings known as technical permanent markings, corresponding to the markings imposed by ISO standard 8980-2 in paragraph 7.1, and more precisely to the markings of paragraphs 7.1a) and 7.1b), since these technical markings are located in the ophthalmic lens in a position determined as a function of the first optical surface and of the second optical surface, stated otherwise directly as a function of an optical reference system provided to the ophthalmic lens.

It will be noted that this optical reference system of the ophthalmic lens is theoretically defined by the prescription to be provided to this lens and in particular by the two diopters especially formed by the first and second optical surfaces and for example by at least one of a mounting point, of a prism reference point, of a nasal temporal axis, of a far vision zone and/or of a near vision zone.

The invention does not apply to markings also known as commercial permanent markings, such as logos or brand marks or markings corresponding to the markings imposed by ISO standard 8980-2 in paragraph 7.1c), since these are located in the ophthalmic lens as a function solely of the shape of the ophthalmic lens after edging for shaping to the form of the frame for which it is intended, but in no case as a function directly of an optical reference system provided to the ophthalmic lens.

It will be noted that the step of additive manufacture of the body and of the first and second faces corresponds to the production of the optical reference system of the ophthalmic lens, also called here invisible and/or theoretical reference system; while the step of additive manufacture of the technical permanent marks corresponds to the production of an optical reference system that may be considered "visible" while being in fact an illustration of the invisible reference system.

The manufacturing method according to the invention is advantageously single-step, with the visible optical reference system being produced during the same step as the invisible optical reference system, in contradistinction to the above-mentioned manufacturing methods of the prior art, called multi-step methods, which are executed by relying furthermore on various intermediate reference systems created at different time points, and which may therefore introduce, at each use of a new reference system, deviations or errors which cause the new reference system to stray from the theoretical optical reference system.

It will be noted that the additive manufacture corresponds here to a method of three-dimensional printing, or of stereolithography, or else of thermoplastic filament extrusion.

According to the invention, the at least one second predetermined volume element forming the technical permanent marks is deposited according to a determined position dependent at one and the same time on the first predetermined volume elements in its immediate neighborhood and on the first predetermined volume elements forming in particular the first and second faces of the ophthalmic lens.

It will also be noted that the complex refractive index is conventionally defined as a complex quantity $n^* = n + i \times k$, n being the real part of the complex index and $i \times k$ is the imaginary part also called the "extinction coefficient" with i the imaginary unit defined such that $i^2 = -1$. By taking the complex nature of the refractive index into account it is possible here to characterize the particular optical properties pertaining to a non-zero value of the extinction coefficient k and related to the choice of a material of index $n^*$ for the ophthalmic lens. These particular properties related to a non-zero value of k may in particular correspond to properties of additives comprising molecules which are absorbent at visible or ultraviolet or infrared wavelengths, and/or colloids which are absorbent at visible or ultraviolet or infrared wavelengths.

According to preferred, simple, convenient and economical characteristics of the method according to the invention:

said step of additively manufacturing comprises a step of determining a manufacturing setting for said ophthalmic lens, comprising geometric characteristics of said body and said first and second faces and geometric characteristics of said technical permanent marks which are dependent on said geometric characteristics of said body and said first and second faces and said first complex refractive index; thereby making it possible to dispose the technical permanent marks according to an optical function resulting from the global geometry of the ophthalmic lens (after additive manufacture of the body and the first and second faces with the material having a first complex refractive index);

said determined position and said geometric characteristics of said technical permanent marks are dependent on the distance, zero or non-zero, separating them from said first and second faces;

said step of additively manufacturing said technical permanent marks is carried out upon the deposition of a plurality of said first volume elements of said first material during the additive manufacture at least of said body of said ophthalmic lens;

said technical permanent marks are produced in said body of said ophthalmic lens, as close as possible to at least one of said first and second faces of said ophthalmic lens;

said step of additively manufacturing said technical permanent marks is carried out upon the deposition of a plurality of said first volume elements of said first material during the additive manufacture at least of one of said first and second faces of said ophthalmic lens;

said technical permanent marks are produced at least as close as possible to a face of said ophthalmic lens, from among said first face or said second face, which exhibits the greatest progression variation;

said step of additively manufacturing said technical permanent marks is carried out upon the deposition by superposition of a plurality of said first volume elements of said first material;

said first material and said second material are configured in such a way that the difference between said first complex refractive index of said first material and said second complex refractive index of said second material is detectable;

the method comprises a step of providing a manufacturing file characteristic of a geometry of said body and of said first and second faces as well as said technical permanent marks of said ophthalmic lens; with said geometric characteristics of said technical permanent marks which are dependent on said geometric characteristics of said body and said first and second faces and said first complex refractive index; and/or the method comprises a step of polishing at least one of said first and second faces of said ophthalmic lens.

The subject of the invention is also a manufacturing machine for producing an ophthalmic lens provided with technical permanent marks by implementing the method as described hereinabove.

The exposition of the invention will now continue with a description, given below by way of illustration and nonlimiting example, of an exemplary embodiment and with reference to the appended drawings in which:

DETAILED DESCRIPTION OF THE INVENTION

Figure 1:
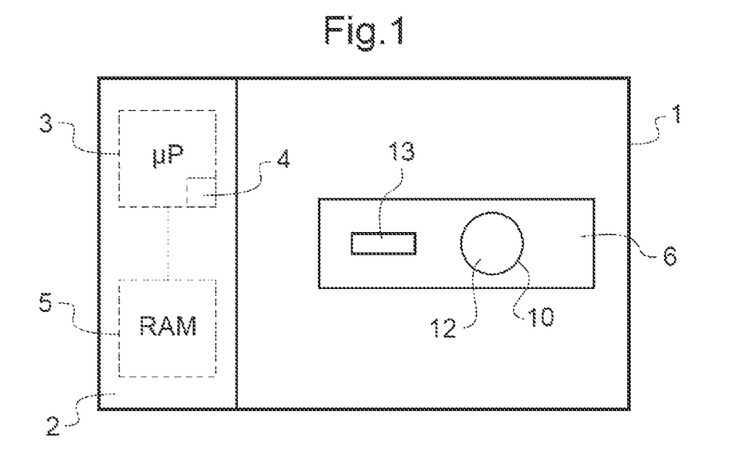
FIG. 1 schematically represents an additive manufacturing machine configured to produce an ophthalmic lens provided with technical permanent marks.

FIG. 1 illustrates an additive manufacturing machine 1, here a numerically-controlled three-dimensional printing machine, numerical control referring to all the hardware and software whose function is to give instructions regarding motion, manipulation of material and command of polymerization means to all the members of the additive manufacturing machine 1.

This additive manufacturing machine 1 is here configured to deposit by juxtaposition a plurality of predetermined volume elements forming superposed layers (stated otherwise layer by layer), of at least one material on a support 10 so as to form an ophthalmic lens 12, including an ophthalmic lens of the type known as progressive possessing furthermore toric and prismatic components.

Each volume element is defined by a predetermined composition and a predetermined size.

As one is dealing here with additive manufacture and in particular with three-dimensional printing, one also speaks of volumetric element, or volume element, also called a voxel (representative of a pixel in three dimensions).

Accordingly, the additive manufacturing machine 1 comprises a nozzle or a bank of nozzles 13 as well as a command and control unit 2 provided with a data processing system comprising a microprocessor 3 furnished with a memory 4, in particular nonvolatile, allowing it to load and store an item of software, stated otherwise a computer program which, when it is executed in the microprocessor 3, allows the implementation of an additive manufacturing method. This nonvolatile memory 4 is for example of ROM ("Read-Only Memory") type.

The unit 2 furthermore comprises a memory 5, in particular volatile, making it possible to store data during the execution of the software and the implementation of the additive manufacturing method.

This volatile memory 5 is for example of RAM or EEPROM type (respectively "Random Access Memory" and "Electrically Erasable Programmable Read-Only Memory").

The additive manufacturing machine 1 comprises moreover an opening 6, here glazed, configured so as to access the ophthalmic lens 12 additively manufactured by this machine 1, which ophthalmic lens 12 is carried by the support 10.

It will be noted that in order to additively manufacture the ophthalmic lens 12, precise knowledge is needed of certain parameters of additive manufacture, such as the speed of advance of the nozzle or nozzles 13, the energy and energy source implemented, here a source emitting in the ultraviolet for the three-dimensional printing machine but it could be a laser in the case of a stereolithography machine or else a heating energy in the case of tensioned thread deposition also called thermoplastic thread extrusion.

Precise knowledge is also needed of the material or materials used and their state, here in liquid form.

Precise knowledge is also needed of the geometry of the ophthalmic lens 12, which is characterized by a manufacturing file characteristic at one and the same time of the simple or complex optical properties of the ophthalmic lens 12 and of the technical permanent marks 24 (FIG. 2) constituting this ophthalmic lens 12, which technical permanent marks are defined and positioned in the lens as a function of the simple or complex optical properties of this lens.

Figure 2:
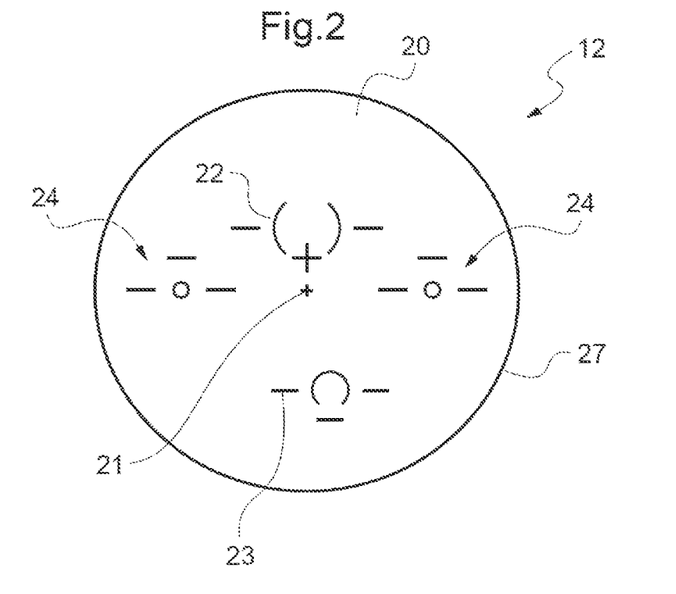
FIG. 2 schematically represents, in elevation, an ophthalmic lens provided in particular with technical permanent marks produced with the manufacturing machine illustrated in FIG. 1.

It will be noted that these technical permanent marks 24 make it possible in particular to correctly position the ophthalmic lens 12 for posterior steps of manufacture of this ophthalmic lens 12; for example surfacing and/or polishing and/or edging of this lens.

It will be noted that other marks 21 to 23, which are temporary and technical, also make it possible to correctly position the ophthalmic lens 12.

FIG. 2 shows a top view of the ophthalmic lens 12 taken in isolation.

This ophthalmic lens 12 exhibits a first face 20 known as the front face, which is convex here, as well as a second face 28 (FIGS. 3 to 6) known as the rear face which is concave here.

The first face 20 defines a first optical surface while the second face 28 defines a second optical surface.

The ophthalmic lens 12 furthermore exhibits a peripheral edge 27 joining the first face 20 to the second face 28.

Here this ophthalmic lens 12 exhibits technical permanent marks 24 and technical temporary marks 21 to 23, namely a mark indicating a reference point 21 situated at the center of this ophthalmic lens 12, a mark indicating a control point 22 of a far vision zone and which is situated just above the reference point 21, a control point 23 of a near vision zone and which is situated below the reference point 21 and a zone 24 passing through a horizontal axis known as nasal-temporal axis (or nose-ear axis).

The marks visible in FIG. 2 which are technical permanent marks correspond here to the zone 24.

In the present case these technical permanent marks 24 are made on the first face 20 of the ophthalmic lens 12.

It will be also noted that at the level of the zone 24 passing through the horizontal axis known as nasal-temporal axis are made two permanent microcircles on either side of the reference point 21 and each at equal distance from the latter.

The ophthalmic lens 12 and in particular the position of the technical microcircles 24 in this ophthalmic lens 12 will now be described in greater detail with reference to FIG. 3.

Figure 3:
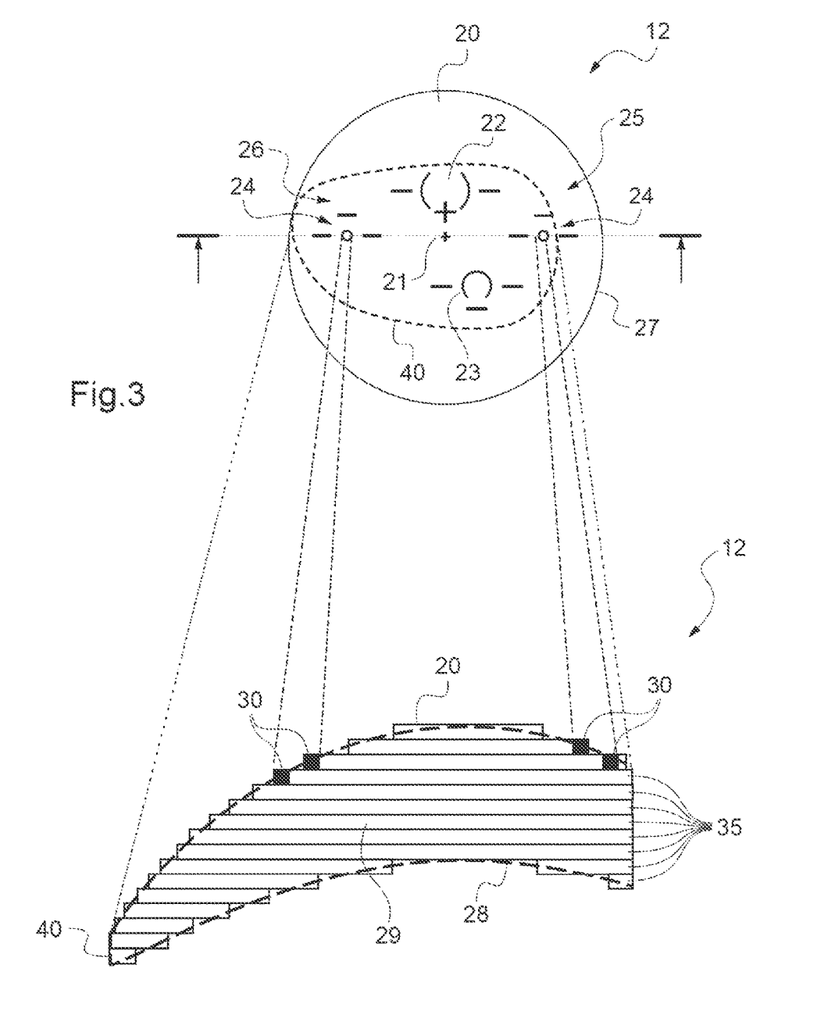
FIG. 3 schematically represents, in elevation and in section, the ophthalmic lens illustrated in FIG. 2.

FIG. 3 shows the ophthalmic lens 12 manufactured by the additive manufacturing machine 1 illustrated in FIG. 1. This ophthalmic lens 12 exhibits a useful zone 26 as well as a non-useful zone 25.

The useful zone 26 is the zone of the ophthalmic lens 12 which is intended to be situated in a spectacle frame when this lens 12 is shaped to the form of the frame and is mounted in the latter. In particular, this useful zone 26 exhibits at least one part having simple optical characteristics (simple vision ophthalmic lens) or complex optical characteristics (progressive ophthalmic lens) necessary to provide a correction to the wearer.

The non-useful zone 25 is for its part intended to disappear in particular during the edging step, also termed cutting, for adapting the shape (the outline) of the ophthalmic lens 12 to the spectacles frame. It will be noted that the method described hereinafter may be configured to manufacture ophthalmic lenses without a non-useful zone, that is to say directly in the shape adapted to the frame (and not therefore requiring any edging or cutting step).

It is also seen in FIG. 3, at the level of the cross-section of the ophthalmic lens 12 taken along a dotted axis at the top of FIG. 3, that the ophthalmic lens 12 exhibits a body 29 arranged between the first face 20 and the second face 28.

It will be noted that on this cross-section is shown only the useful zone 26 of the ophthalmic lens 12, which therefore comprises an edged peripheral outline 40, that is to say cut to the shape of the frame, independently of the method used to obtain this edged peripheral outline.

The ophthalmic lens 12 is formed here by a plurality of superposed layers of a first material 35, each layer being itself formed of a plurality of first predetermined volume elements.

This plurality of superposed layers forms the body 29 together with the second face 28 and the first face 20 of the ophthalmic lens 12.

It will be observed that, even though here the ophthalmic lens 12 is already edged, the superposed layers of the first material 35 exhibit different lengths so as to form the first and second faces 20 and 28 of this ophthalmic lens 12.

These layers here each exhibit a constant thickness over their length and they all exhibit the same thickness.

It will be noted that this equi-thickness is obtained here by virtue of the controlled diffusion, by the nozzle or the bank of nozzles 13 of the manufacturing machine 1, of a determined quantity of first predetermined volume elements for each superposed layer of the first material 35.

It will be noted that here the first material is an acrylic polymer, and more precisely a photopolymer, for example a photopolymer such as the product marketed by the company OBJET Ltd, under the trademark VeroClear™, having a refractive index equal to about 1.5.

FIG. 3 also shows that the microcircles 24 form technical permanent marks made at the level of the first face 20 of the ophthalmic lens 12.

It will be noted that here these technical microcircles 24 are made as close as possible to the first face 20 since this is the most "complex" face of the ophthalmic lens, that is to say, in the case of a progressive lens, the face which exhibits the greatest progression (stated otherwise the largest difference in altitude, ignoring toric and spherical components, if any).

Here (FIG. 3), these microcircles 24 forming technical permanent marks are formed in the thickness of two superposed layers of the first material 35.

Accordingly, the ophthalmic lens 12 comprises several predetermined volume elements of a second material 30, disposed in the thickness of several of the layers of the first material 35.

The technical microcircle 24 made on the left in FIG. 3 is formed of at least one predetermined volume element of the second material 30 disposed in the thickness of a first layer of the first material 35 and of at least one other predetermined volume element of the second material 30 disposed in the thickness of a second layer of the first material 35 immediately above the first layer.

The technical microcircle 24 made on the right in FIG. 3 is for its part formed of at least one predetermined volume element of the second material 30 disposed in the thickness of the second layer of the first material 35 and of at least one other predetermined volume element of the second material 30 disposed in the thickness of a third layer of the first material 35 immediately above the second layer.

Each technical microcircle 24 forming a permanent mark is manufactured here additively by the deposition, during the deposition of two superposed and successive layers of the first material 35, of a determined number of predetermined volume elements of the second material 30.

It will be noted that the second material 30 is here an acrylic polymer comprising colloidal particles of Zirconia $ZrO_2$ and having a second complex refractive index of about 1.53.

The first material 35 therefore presents a complex refractive index different from the complex refractive index of the second material 30 and more precisely, the difference between these complex refractive indices is here of the order of about 0.03, the values of the extinction coefficients being zero.

This complex refractive index difference makes it possible for these microcircles 24 forming technical permanent marks to be rendered visible for example by an optician albeit without bothering the vision of the wearer of this ophthalmic lens 12.

These technical microcircles 24 are detectable for example by illumination and detection devices.

It will be noted that the visibility of the technical microcircles 24 is dependent in particular on their geometry, which geometry is defined by the number of second predetermined volume elements of the second material 30 and the arrangement of these second predetermined volume elements with respect to one another and with respect to the first predetermined volume elements of the first material 35.

The steps of additive manufacture of the ophthalmic lens 12 which has just been described, by virtue in particular of the additive manufacturing machine 1 illustrated in FIG. 1, will now be described with reference to FIGS. 7 and 8.

Figure 7:
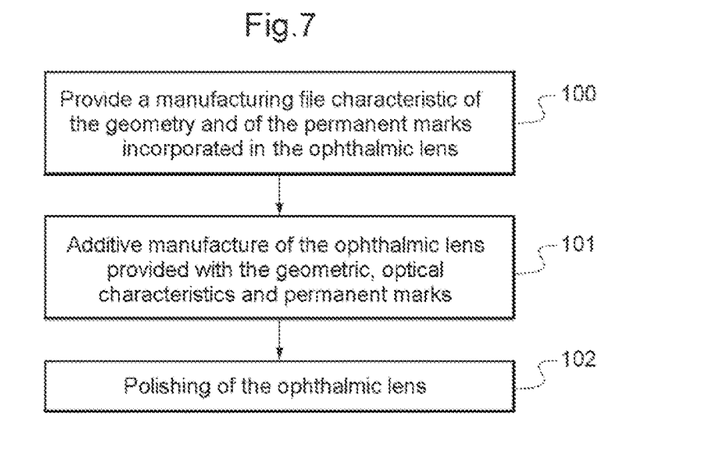
FIG. 7 is a block diagram illustrating various operating steps of a method, implemented at least partially in the machine of FIG. 1, for manufacturing an ophthalmic lens.
Figure 8:
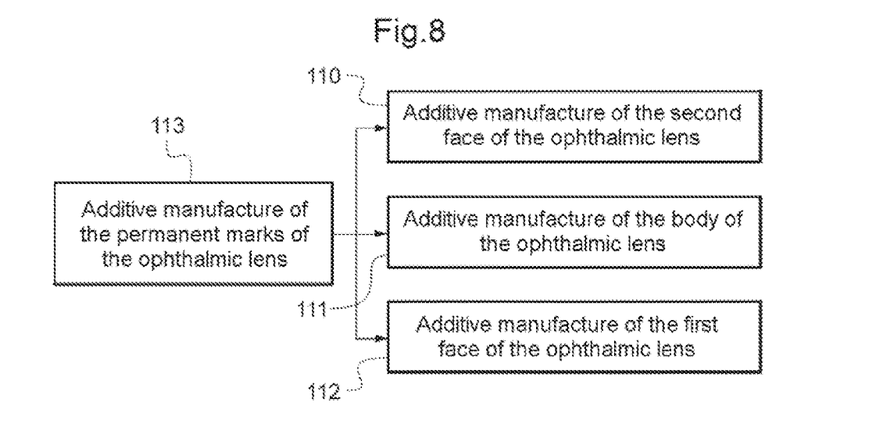
FIG. 8 is a block diagram illustrating a step of additive manufacture of the ophthalmic lens of the method illustrated in FIG. 7.

FIG. 7 is a block diagram of the steps allowing the manufacture of the ophthalmic lens 12.

The command and control unit 2 is configured to determine a manufacturing setting for the ophthalmic lens 12, which setting comprises the geometric characteristics of the body 29 and of the first and second faces 20 and 28 and the geometric and positioning characteristics of the technical permanent marks 24 which are dependent on the geometric characteristics of the body 29 and the first and second faces 20 and 28 and the first complex refractive index.

It will be noted that the geometric characteristics of the body 29 and of the first and second faces 20 and 28, together with the first complex refractive index, define an invisible optical reference system of the lens, while the geometric and positioning characteristics of the technical permanent marks 24 define a visible optical reference system of the lens, illustrating the invisible optical reference system.

The determined position and the geometric characteristics of the technical permanent marks 24 are in particular dependent on the distance, zero or non-zero, separating them from the first and second faces 20 and 28.

The command and control unit 2 is configured to provide in step 100 a manufacturing file characteristic of the geometry and technical permanent marks 24 incorporated in the ophthalmic lens 12 to be manufactured, which manufacturing file is generated on the basis of the previously determined manufacturing setting.

Here this is a manufacturing file characteristic of the geometry of the body 29 and of the first and second faces 20 and 28 as well as of all the technical permanent marks of the ophthalmic lens 12, which technical permanent marks 24 are characterized (in terms of position) as a function of the geometric characteristics of the body 29 and of the first and second faces 20 and 28 and of the first complex refractive index in which this body 29 and these faces 20 and 28 are produced. It will be noted that this file takes into account all the optical functions prescribed for the ophthalmic lens 12, be they simple or progressive with or without toric or indeed prismatic components.

This manufacturing file comprises geometric surface characteristics at a finite number of points, as well as the material characteristics.

The command and control unit 2 is thereafter configured to determine on the basis of the manufacturing file received in step 100, the number of first predetermined volume elements and the number of layers of the first material 35 to be deposited successively in a superposed manner, as well as the number of second predetermined volume elements of second material 30 to be deposited and the location at which to deposit them during the deposition of the first predetermined volume elements of the first material 35.

The method thereafter comprises step 101 of additively manufacturing the ophthalmic lens 12 provided with the geometric, optical characteristics and with the technical permanent marks 24 in the body 29 and the first and second faces 20 and 28 of this ophthalmic lens 12.

More precisely, the method comprises here simultaneously steps 110, 111 and 112 (FIG. 8) of additively manufacturing respectively the second face 28, the body 29 and the first face 20 of the ophthalmic lens 12, by depositing a plurality of layers of the first material 35 by virtue of the nozzle or the bank of nozzles 13, on the support 10 of the machine 1.

The method furthermore comprises step 113 of additively manufacturing the technical permanent marks 21 to 24 of the ophthalmic lens 12 at the same time as any one of steps 110, 111 and 112 of additive manufacture respectively of the second face 28, of the body 29 and of the first face 20 of the ophthalmic lens 12.

The method can furthermore comprise a step 102 of polishing the additively manufactured ophthalmic lens 12.

Here, the method is configured to manufacture the ophthalmic lens 12 directly in the shape of the frame and does not require any edging or cutting. As a variant, the method also comprises a step of edging or cutting the ophthalmic lens to the shape of the frame.

It will be noted that here the additive manufacturing machine illustrated in FIG. 1 makes it possible to implement only steps 100, 101 and 110 to 113 of the method, while the optional polishing, edging and cutting steps 102 are generally carried out in a machining and/or grinding machine, provided with a reference system separate from that of the additive manufacturing machine.

Variant embodiments of the ophthalmic lens 12 will now be described with reference to FIGS. 4 to 6, manufactured here by three-dimensional printing with the aid of the additive manufacturing machine illustrated in FIG. 1, which implements steps 100, 101 and 110 to 113 of the manufacturing method illustrated in FIGS. 7 and 8.

Figure 4:
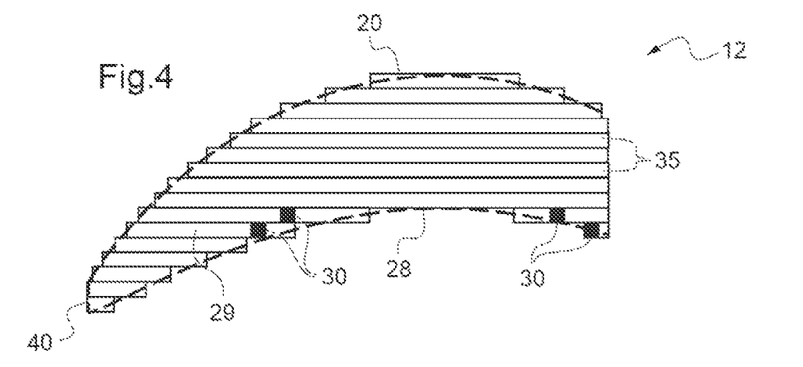
FIGS. 4 to 6 are sectional schematic views of variant embodiments of the ophthalmic lens of FIG. 3.
Figure 5:
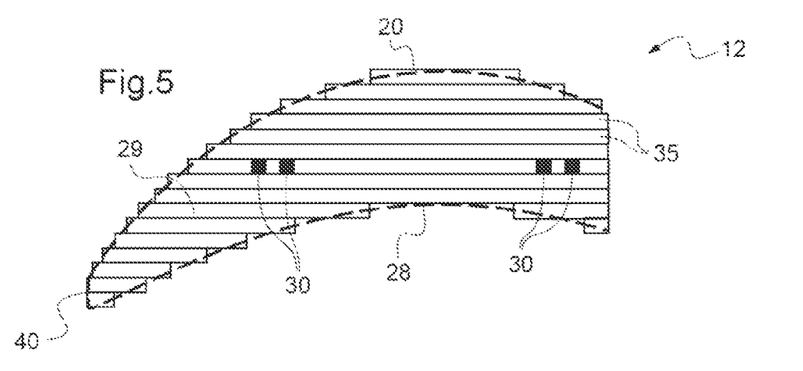
Figure 6:
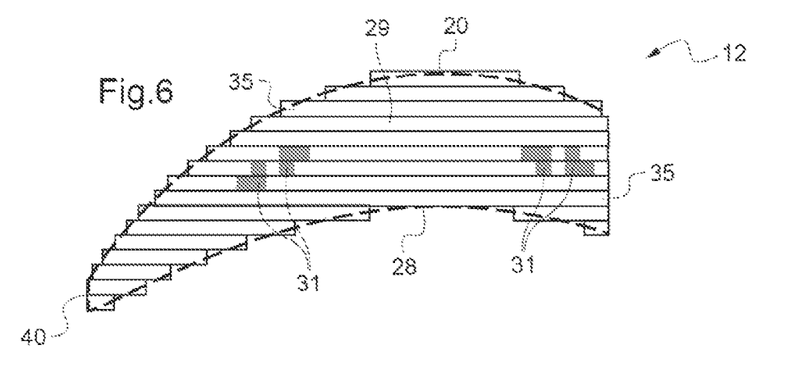

FIGS. 4 to 6 are similar to the sectional view in FIG. 3 and it will be noted that the technical permanent marks visible in FIGS. 4 to 6 are therefore also representative of the microcircles on the zone 24 of the ophthalmic lens 12.

It will be observed that the references used in FIGS. 4 to 6 are identical to those used in FIG. 3 since the ophthalmic lenses 12 illustrated in FIGS. 3 to 6 are similar, with the exception of the microcircles forming the technical permanent marks which are disposed differently on each of these ophthalmic lenses 12 (that is to say made at different locations to the locations where they are deposited in FIG. 3).

In FIG. 4, the microcircles forming technical permanent marks are made at the level of the first face 28 of the ophthalmic lens 12 since in the present case this is the face which exhibits the most "complex" optical surface of this ophthalmic lens 12.

Here the microcircles are each additively manufactured in the thickness of the two same layers of the first material 35 during the additive manufacture of the body 29 and of the second face 28 of this ophthalmic lens 12.

These microcircles forming technical permanent marks are formed in the same manner as previously, that is to say by the deposition of a determined number of predetermined volume elements of the second material 30 at the time of the deposition of the layers of the first material 35.

Here the first and second materials are identical to those described previously.

FIG. 5 illustrates for its part an ophthalmic lens 12 similar to that of FIGS. 3 and 4 with the exception of the fact that here the microcircles forming technical permanent marks are each additively manufactured in the thickness of one and the same layer of the first material during the additive manufacture of the body 29 of the ophthalmic lens 12.

These microcircles are disposed remote both from the first face 20 and from the second face 28 of this ophthalmic lens 12.

As previously, the first material 35 and the second material 30 are identical to those described hereinabove.

Here the microcircles forming technical permanent marks are manufactured additively by depositing a determined number of predetermined volume elements of the second material 30 during the deposition (that is to say at the same time) of a single layer of the first material 35.

FIG. 6 illustrates for its part an ophthalmic lens 12 similar to that of FIG. 5 (as regards the location of the microcircles in the body 29) with the exception of the fact that here the second material is different from the second material described for FIG. 3 and used for FIGS. 4 and 5, while the first material 35 is the same as that described hereinabove.

Here the second material 31 is a material also known as fluorescent, for example a polymer formulation comprising molecules from the family of the Coumarins.

In the ophthalmic lens 12 illustrated in FIG. 6, the microcircles forming technical permanent marks are manufactured in the body 29 of this ophthalmic lens 12, but in contradistinction to the ophthalmic lens of FIG. 5, here, these microcircles are each additively manufactured during the deposition (that is to say at the same time) of two or three successive and superposed layers of the first material 35.

In variants that are not illustrated:
the technical permanent marks are not made at the sites illustrated in FIGS. 3 and 6 but elsewhere in the ophthalmic lens as long as they are made in the useful zone as a function of the invisible optical reference system of the ophthalmic lens;
the first and second materials are different from those indicated hereinabove, as long as their complex refractive indices are different with this difference being detectable (the difference between the two complex indices may pertain to the real part and/or the imaginary part of these indices);
the ophthalmic lens comprises technical permanent marks at one and the same time at the level of the first face and/or of the second face and/or in the body;
the plurality of first predetermined juxtaposed and superposed volume elements forms superposed layers which each exhibit a thickness which is constant or variable over their length and/or which all do or do not exhibit the same thickness;
the first material is for example a transparent material formed by stereolithography, this material being for example an epoxy polymer marketed by the company 3D SYSTEMS under the trademark Accura® Clear-Vue™, having a refractive index of close to 1.5;

the first material is a photopolymer comprising one or more families of molecules having one or more acrylic, methacrylic, acrylate, methacrylate functions, a family of molecules having one or more epoxy, thioepoxy functions, a family of molecules having one or more vinyl ether, vinyl caprolactam, vinylpyrolidone functions or a combination of these functions; the chemical functions mentioned being able to be carried by monomers or oligomers or a combination of monomers and oligomers;

the first material can comprise at least one photo-initiator;

the first material can comprise colloids, in particular colloidal particles having smaller dimensions for example than visible wavelengths, such as for example colloidal particles of Silica oxide $SiO_2$ or colloidal particles of Zircon oxide $ZrO_2$;

the second material is a dye which belongs to the families of the azos, or rhodamines, or cyanines, or polymethines, or merocyanines, or fluoresceins, or pyrylium, or phthalocyanines, or perylenes, or benzanthrones, or anthrapyrimidines, or anthrapyridones, or else a dye provided with metallic complexes such as rare earth chelates or cryptates;

the method furthermore comprises one or more steps before the optional step of polishing the ophthalmic lens, for example the marking step to form marks also known as temporary marks;

the additive manufacturing machine is not a three-dimensional printing machine but rather a stereolithography machine (or SLA for "Stereolytograpy Apparatus") or a thermoplastic filament extrusion machine, also called a tensioned filament deposition machine (or FDM for "Fuse Deposition Modeling"); and/or the command and control unit does not comprise a microprocessor, but rather a microcontroller.

It is recalled more generally that the invention is not limited to the examples described and represented.

The invention claimed is:

1. A method for manufacturing an ophthalmic lens, the method comprising:

a marking operation for producing technical permanent marks on said ophthalmic lens that exhibits a body, a first face, and a second face opposite to said first face, the first face and the second face respectively defining a first optical surface and a second optical surface, the marking operation comprising additively manufacturing said body and said first and second faces, by depositing a plurality of first predetermined volume elements of a first material having a first complex refractive index, to obtain said first and second optical surfaces, and additively manufacturing said technical permanent marks by depositing, during said depositing the plurality of said first predetermined volume elements of said first material, at least one second predetermined volume element of a second material having a second complex refractive index different from said first complex refractive index of said first material, the technical permanent marks being located in a zone of the ophthalmic lens passing through a horizontal axis, on either side and at an equal distance from a reference point, wherein the technical permanent marks are characteristic of an optical reference system to be provided to said ophthalmic lens and are located in said ophthalmic lens in a determined position dependent on said first and second optical surfaces, the technical permanent marks are additively formed in a plurality of successive and superposed layers of the first material, wherein at least two of the technical permanent marks are in a same layer, and the first face and the second face are curved, the first face being convex and the second face being concave, the plurality of superposed layers between the first face and the second face being flat layers in a direction perpendicular to a vertical axis passing through the first face and the second face.

2. The method as claimed in claim 1, wherein the additively manufacturing the body and the first and second faces comprises determining a manufacturing setting for said ophthalmic lens, the manufacturing setting comprising geometric characteristics of said body and said first and second faces and geometric characteristics of said technical permanent marks which are dependent on said geometric characteristics of said body and on said first and second faces and on said first complex refractive index.

3. The method as claimed in claim 2, wherein said additively manufacturing said technical permanent marks is carried out upon the depositing the plurality of said first volume elements of said first material during the additive manufacture at least of said body of said ophthalmic lens.

4. The method as claimed in claim 2, wherein said additively manufacturing said technical permanent marks is carried out upon the depositing the plurality of said first volume elements of said first material during the additive manufacture at least of one of said first and second faces of said ophthalmic lens.

5. The method as claimed in claim 2, wherein said determined position and said geometric characteristics of said technical permanent marks are dependent on the distance, zero or non-zero, separating the technical permanent marks from said first and second faces.

6. The method as claimed in claim 5, wherein said additively manufacturing said technical permanent marks is carried out upon the depositing the plurality of said first volume elements of said first material during the additive manufacture at least of said body of said ophthalmic lens.

7. The method as claimed in claim 5, wherein said additively manufacturing said technical permanent marks is carried out upon the depositing the plurality of said first volume elements of said first material during the additive manufacture at least of one of said first and second faces of said ophthalmic lens.

8. The method as claimed in claim 1, wherein said additively manufacturing said technical permanent marks is carried out upon the depositing the plurality of said first volume elements of said first material during the additive manufacture at least of said body of said ophthalmic lens.

9. The method as claimed in claim 8, wherein said technical permanent marks are produced in said body of said ophthalmic lens, as close as possible to at least one of said first and second faces of said ophthalmic lens.

10. The method as claimed in claim 1, wherein said additively manufacturing said technical permanent marks is carried out upon the depositing the plurality of said first volume elements of said first material during the additive manufacture at least of one of said first and second faces of said ophthalmic lens.

11. The method as claimed in claim 1, wherein said technical permanent marks are produced at least as close as possible to a face of said ophthalmic lens, from among said first face or said second face, which exhibits the greatest progression variation.

12. The method as claimed in claim 1, wherein said first material and said second material are configured in such a way that the difference between said first complex refractive index of said first material and said second complex refractive index of said second material is detectable.

13. The method as claimed in claim 1, further comprising providing a manufacturing file characteristic of a geometry of said body and of said first and second faces and said technical permanent marks of said ophthalmic lens, said geometric characteristics of said technical permanent marks being dependent on said geometric characteristics of said body and said first and second faces and said first complex refractive index.

14. The method as claimed in claim 1, further comprising polishing at least one of said first and second faces of said ophthalmic lens.

15. The method as claimed in claim 1, wherein the technical permanent marks are microcircles.

16. The method as claimed in claim 1, wherein the horizontal axis is a nasal-temporal axis.

17. The method as claimed in claim 1, wherein the reference point is situated at a center of the ophthalmic lens.

18. A method for manufacturing an ophthalmic lens, the method comprising:
   a marking operation for producing technical permanent marks on said ophthalmic lens that exhibits a body, a first face, and a second face opposite to said first face, the first face and the second face respectively defining a first optical surface and a second optical surface, the marking operation comprising
      additively manufacturing said body and said first and second faces, by depositing a plurality of first predetermined volume elements of a first material having a first complex refractive index, to obtain said first and second optical surfaces, and
      additively manufacturing said technical permanent marks by depositing, during said depositing the plurality of said first predetermined volume elements of said first material, at least one second predetermined volume element of a second material having a second complex refractive index different from said first complex refractive index of said first material, the technical permanent marks being located in a zone of the ophthalmic lens passing through a horizontal axis, on either side and at an equal distanced from a reference point, the technical permanent marks being at least alignment reference markings comprising two marks located 34 mm apart, equidistant to a vertical plane through a fitting point or prism reference point,
   wherein the technical permanent marks are characteristic of an optical reference system to be provided to said ophthalmic lens and are located in said ophthalmic lens in a determined position dependent on said first and second optical surfaces,
   the technical permanent marks are additively formed in a plurality of successive and superposed layers of the first material, wherein at least two of the technical permanent marks are in a same layer, and
   the first face and the second face are curved, the first face being convex and the second face being concave, the plurality of superposed layers between the first face and the second face being flat layers in a direction perpendicular to a vertical axis passing through the first face and the second face.

* * * * *